US006076294A

United States Patent [19]

Durbin

[11] Patent Number: 6,076,294

[45] Date of Patent: *Jun. 20, 2000

[54] ILLUMINATED SIGN

[75] Inventor: Martin J. Durbin, Oak Forest, Ill.

[73] Assignee: Lumenids, Ltd., Hazel Crest, Ill.

[ * ] Notice: This patent is subject to a terminal disclaimer.

[21] Appl. No.: 09/436,713

[22] Filed: Nov. 9, 1999

Related U.S. Application Data

[63] Continuation of application No. 09/188,951, Nov. 10, 1998, Pat. No. 6,023,869.

[51] Int. Cl.[7] ..................... G06F 13/22

[52] U.S. Cl. ..................... 40/544; 40/546

[58] Field of Search ..................... 40/544, 546, 547

[56] References Cited

U.S. PATENT DOCUMENTS

| | | |
|---|---|---|
| 1,759,782 | 5/1930 | Fox . |
| 1,787,595 | 1/1931 | Rava . |
| 2,027,034 | 1/1936 | Fuller, Jr. . |
| 2,072,454 | 3/1937 | Jackson . |
| 2,177,641 | 10/1939 | Evans . |
| 2,548,126 | 4/1951 | Sholkin . |
| 2,810,225 | 10/1957 | Hardesty . |
| 3,316,435 | 4/1967 | Kelso . |
| 3,497,686 | 2/1970 | Young . |
| 3,968,584 | 7/1976 | Kingston . |
| 4,009,535 | 3/1977 | Stock . |
| 4,573,766 | 3/1986 | Bournay, Jr. et al. . |
| 4,715,137 | 12/1987 | Scheve . |
| 4,744,012 | 5/1988 | Bergkvist . |
| 4,779,166 | 10/1988 | Tanaka et al. . |
| 4,782,432 | 11/1988 | Coffman . |
| 4,791,755 | 12/1988 | Pohn . |
| 4,862,613 | 9/1989 | Eyngorn . |
| 4,903,172 | 2/1990 | Schöniger et al. . |
| 4,918,578 | 4/1990 | Thompson . |
| 4,989,956 | 2/1991 | Wu et al. . |
| 5,009,019 | 4/1991 | Erlendsson et al. . |
| 5,124,890 | 6/1992 | Choi et al. . |
| 5,365,411 | 11/1994 | Rycroft et al. . |
| 5,460,325 | 10/1995 | Surman . |
| 5,522,540 | 6/1996 | Surman . |
| 5,585,160 | 12/1996 | Osthassel . |
| 5,640,792 | 6/1997 | Smith et al. . |
| 5,678,334 | 10/1997 | Schöniger . |
| 5,829,177 | 11/1998 | Hjaltason . |
| 5,842,297 | 12/1998 | Tung . |
| 6,023,869 | 2/2000 | Durbin ..................... 40/544 |

FOREIGN PATENT DOCUMENTS

| | | |
|---|---|---|
| 2544528 | 10/1984 | France . |
| 2705920 | 8/1978 | Germany . |
| 175450 | 5/1961 | Sweden . |

*Primary Examiner*—Terry Lee Melius
*Assistant Examiner*—Andrea Chop
*Attorney, Agent, or Firm*—Rockey, Milnamow & Katz, Ltd.

[57] ABSTRACT

An illuminated sign comprises a photoconductive plate and a series of light-emitting diodes of a type having a viewing angle of approximately 8°. Being made from polycarbonate in a single piece, the photoconductive plate is inset from its back face, toward its front face but not through it, so as to define a series of indicia, each having a boundary. Each light-emitting diode is pressed into a recess opening at an outer periphery of the photoconductive plate, between the front and back faces. The recesses orient the light-emitting diodes so that a part of the boundary of each of the indicia is disposed within the viewing angle of at least one of the light-emitting diodes and so that another part thereof is not disposed within the viewing angle of any of the light-emitting diodes. An opaque material covers the back face of the photoconductive plate, at least where the back face is visible through the front face thereof, except where the photoconductive plate is inset so as to define the indicia. A fluorescent material covers the indicia and is adapted to fluoresce at a color matching the color of light emitted by the light-emitting diodes when energized.

9 Claims, 2 Drawing Sheets

ILLUMINATED SIGN

CROSS-REFERENCE TO RELATED APPLICATION

This application is a continuation of U.S. patent application Ser. No. 09/188,951, which was filed on Nov 10, 1998, now Pat. No. 6,023,869.

TECHNICAL FIELD OF THE INVENTION

This invention pertains to an illuminated sign. In a preferred embodiment, the illuminated sign employs a photoconductive plate, which is inset so as to define a series of indicia covered by a fluorescent material, and a series of light-emitting diodes of a type having a viewing angle not more than approximately 8°.

BACKGROUND OF THE INVENTION

Although this invention has resulted from efforts to develop an address sign, which could be solar-powered, for a roadside mailbox, this invention is expected to have a wide variety of other similar and dissimilar applications.

Solar-powered, mailbox-mounted, address signs are disclosed in U.S. Pat. Nos. 5,460,325 and No. 5,522,540 to Surman. U.S. Pat. No. 5,522,540 discloses that a light-emitting diode is used to illuminate such a sign.

Other signs illuminated by light-emitting diodes are disclosed in U.S. Pat. No. 4,903,172 to Schoniger et al and in U.S. Pat. No. 5,265,411 to Rycroft et al.

Fluorescent materials in or for illuminated signs are disclosed in U.S. Pat. No. 4,989,956 to Wu et al., U.S. Pat. No. 5,009,019 to Erlendsson et al., in U.S. Pat. No. 5,585,160 to Østhassel.

Illuminated signs providing further background are disclosed in U.S. Pat. No. 1,759,782 to Fox, U.S. Pat. No. 2,548,126 to Sholkin, U.S. Pat. No. 4,791,745 to Pohn, and U.S. Pat. No. 4,862,613 to Eyngom.

SUMMARY OF THE INVENTION

Broadly, as provided by this invention, an illuminated sign comprises a photoconductive plate and a light-emitting diode of a type having a viewing angle not more than approximately 45°, preferably a viewing angle of approximately 8°.

The photoconductive plate is inset from its back face, toward its front face but not through it, so as to define an indicium having a boundary. The light-emitting diode is pressed into a recess opening at an outer periphery of the photoconductive plate, between the front and back faces. The recess orients the light-emitting diode so that a part of the boundary of the indicium is disposed within the viewing angle of the light-emitting diode. Preferably, however, the recess orients the light-emitting diode so that a part of the boundary of the indicium is not disposed therewithin.

Preferably, the photoconductive plate is inset, as mentioned above, so as to define a series of indicia with each indicium having a boundary. Preferably, moreover, the illuminated sign comprises a series of light-emitting diodes of the type noted above. Each light-emitting diode is pressed into a recess opening at an outer periphery of the photoconductive plate, between the front and back faces. The recesses orient the light-emitting diodes so that a part of the boundary of each of the indicia is disposed within the viewing angle of at least one of the light-emitting diodes. Preferably, however, the recesses orient the light-emitting diodes so that a part of the boundary of each of the indicia is not disposed within the viewing angle of at least one of the light-emitting diodes.

Preferably, an opaque material covers the back face of the photoconductive plate, at least where the back face is visible through the front face thereof, except where the photoconductive plate is inset so as to define the indicium or indicia, and a fluorescent material covers the indicium or indicia. Being visible through the front face of the photoconductive plate, the fluorescent material is adapted to fluoresce when illuminated by ambient light, by light emitted by the light-emitting diode or diodes when energized, or by both.

Preferably, each light-emitting diode is adapted when energized to emit light of a specific color, and the fluorescent material is adapted when fluorescing to emit light of a color matching the specific color. Preferably, moreover, the specific and matching colors are red-orange.

For the photoconductive plate, polycarbonate is a preferred material, but glass having suitable optical properties or another polymeric material having suitable optical properties may be alternatively employed. Preferably, the indicia are milled into the photoconductive plate, but the indicia may be instead molded, engraved, incised, or inset otherwise into the photoconductive plate.

Preferably, the opaque material is an opaque enamel of a suitable color, such as black. Preferably, the fluorescent material is a sheet of paper with a fluorescent surface or a sheet of a suitable, polymeric material, such as polycarbonate, with a fluorescent surface and the sheet is affixed adhesively to the back face of the photoconductive plate, over the opaque material.

These and other objects, features, and advantages of this invention are evident from the following description of a preferred embodiment of this invention, with reference to the accompanying drawings.

DETAILED DESCRIPTION OF THE PREFERRED EMBODIMENT

Figure 1:
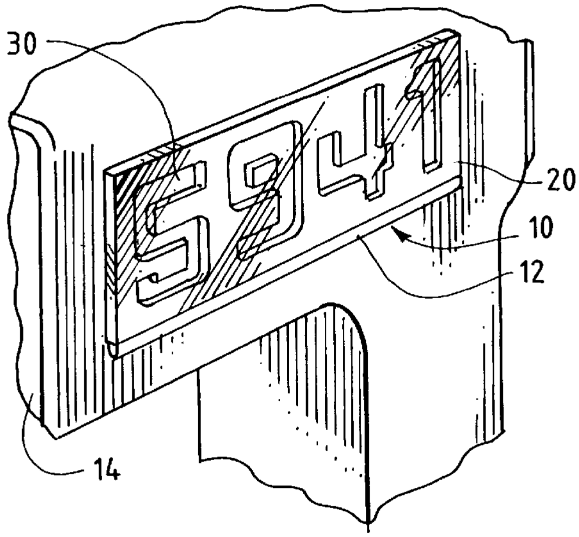
FIG. 1 is a perspective view of an illuminated sign constituting a preferred diment of this invention, as mounted on a roadside mailbox, which is shown fragmentarily.
Figure 3:
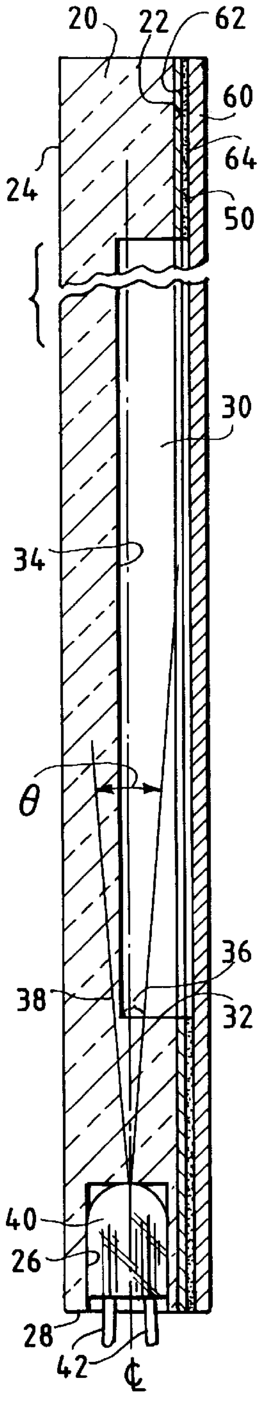
FIG. 3. on a larger scale compared to FIG. 2, is a sectional view taken along line 2—2 of FIG. 2, in a direction indicated by arrows.
Figure 2:
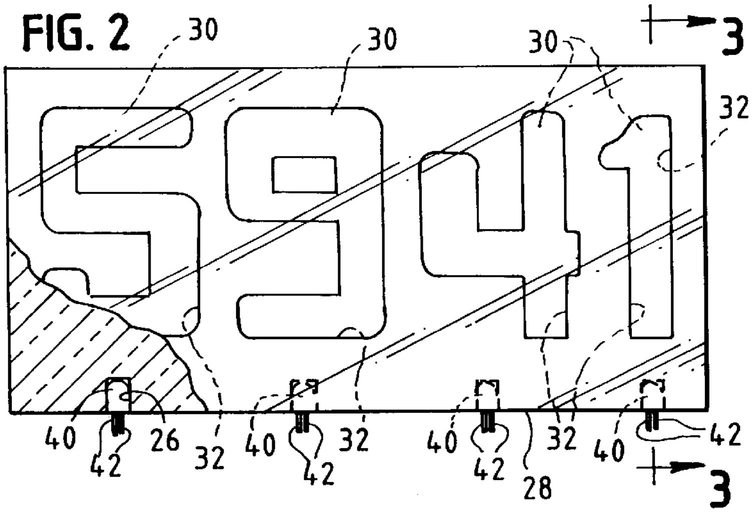
FIG. 2. on a larger scale compared to Figure q, is a front, elevational view of the illuminated sign, except for an outer frame shown in FIG. 1 but omitted in FIG. 2.
Figure 4:
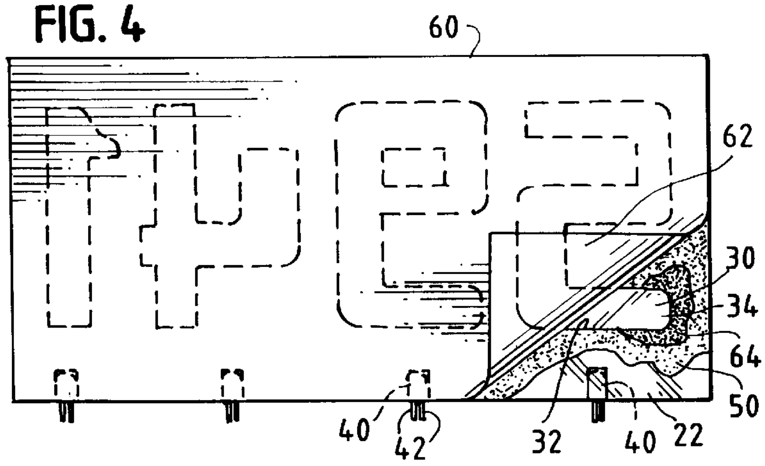
FIG. 4. on an intermediate scale compared to FIGS. 1 and 2, is an exploded, perspective view of the illuminated sign, as shown in FIG. 2.

As shown in FIG. 1, an illuminated sign 10 constituting a preferred embodiment of this invention is mounted in an outer frame 12, on a roadside mailbox 14 shown fragmentarily. As shown in FIGS. 2, 3, and 4, in which the outer frame 12 is omitted, the illuminated sign 10 comprises a photoconductive plate 20 and, for each of a series of four numerical indicia 30, a light-emitting diode 40 of a type having a viewing angle Θ not more than approximately 8°.

Figure 6:
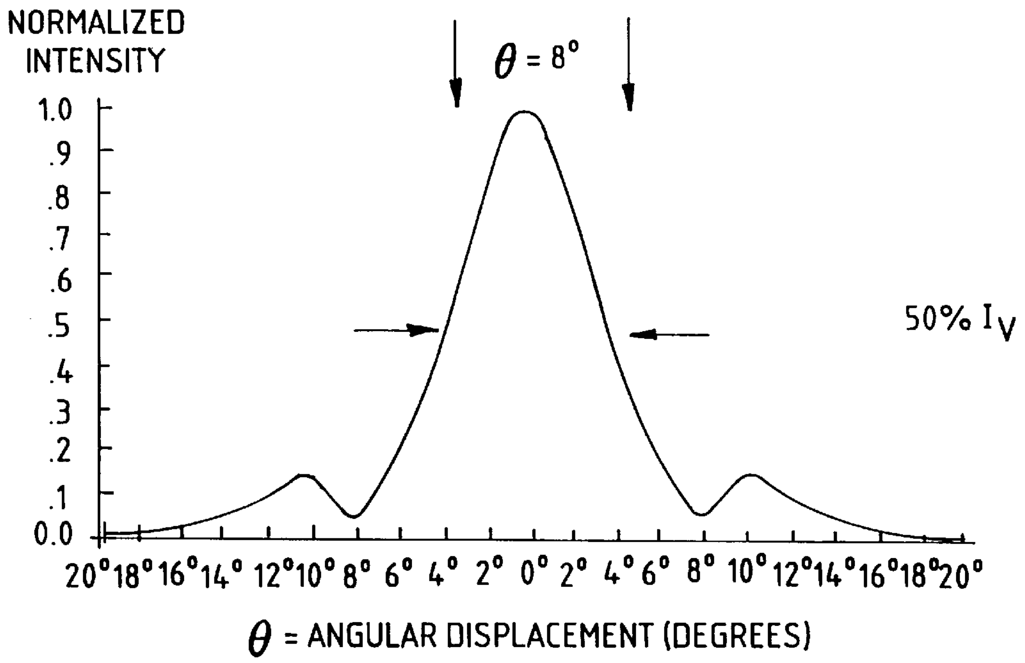
FIG. 6 is a graphical plot of normalized luminous intensity modeled mathematically as a sinc function (sin Θ/Θ) and plotted against angular displacement in degrees, for a light-emitting diode of the type used in the preferred embodiment, on which plot the angular width of the peak curve at half maximum amplitude of normalized luminous intensity is noted as the viewing angle (Θ) of the light-emitting diode.

The normalized luminous intensity ($I_v$) of a light-emitting diode can be mathematically modeled as a sinc function (sinΘ/Θ) can be graphically plotted against angular displacement in degrees, whereupon the angular width of the peak curve at half maximum amplitude of normalized luminous intensity is defined as the viewing angle Θ. As represented graphically in FIG. 6, the viewing angle Θ is approximately 8° for a light-emitting diode of the type noted above, such as each of the light-emitting diodes 40.

As shown in FIGS. 3 and 4, the photoconductive plate 20 has is inset, by being milled, from its back face 22, toward its front face 24 but not through the plate 20, so as to define the indicia 30 with each indicium 30 having a boundary 32 and an inner face 34. As shown in FIGS. 1 and 2, the indicia 30 are inset as mirror images to an observer observing the back face 22, so as to appear normal to an observer observing the front face 24. Although the indicia 30 are numerical indicia, alphabetical or other indicia may be alternatively employed, as for applications other than address signs.

Preferably, the photoconductive plate 20 is made from polycarbonate, such as Lexan™, with a thickness of approximately 0.25 inch, except where inset. As used as an address sign having four indicia 30, the photoconductive plate 20 may have a height of approximately 3 inches and a width of approximately 6.25 inches. Alternatively, the photoconductive plate 20 is made from glass having suitable optical properties or from another suitable, polymeric material having suitable optical properties.

Figure 5:
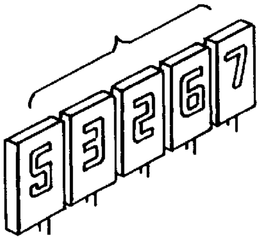
FIG. 5. on a smaller scale compared to FIG. 1, is an exploded, perspective view showing, in an alternative embodiment of this invention, several photoconductive subplates, each being inset so as to define an indicium, in an edge-to-edge arrangement.

Preferably, as shown in FIGS. 1 through 4, the photoconductive plate 20 is made in a single piece. Alternatively, as shown in FIG. 5, the photoconductive plate is divided into several subplates, which are retained by an outer frame (not shown) in an edge-to-edge arrangement with each piece having one of the indicia. Such subplates may be also called tiles.

Preferably, the light-emitting diodes 40 are of a type employing aluminum indium gallium phosphide (AlInGaP) substrates, emitting light of a red-orange color at approximately 617 nm with a typical luminous intensity ($I_v$) of approximately 9000 mcd, and having a centerline and having a viewing angle (Θ) of approximately 8°, as available commercially from Hewlett Packard Corporation under its trade designation HLMT-CH00. Each light-emitting diode 40 has two electrical leads 42 extending from it.

Being associated with a respective one of the indicia 30, each light-emitting diode 40 is pressed into a recess 26 opening into an outer periphery 28 of the plate 20, between the back face 22 and the front face 24. It is important to note that the outer periphery 28 is not limited to a lower edge, as shown but is regarded as extending around the plate 20 so as to include an upper edge and two lateral edges. As shown in FIG. 3, in which the viewing angle Θ is marked by two rays emanating from one of the light-emitting diodes 40, the centerline bisecting the rays, the recess 26 for each light-emitting diode 40 orients such light-emitting diode 40 so that a major part 36 of the boundary 32 of each indicium 32 is disposed within the viewing angle Θ of at least one of the light-emitting diodes 40, and so that a minor part 38 of the boundary 32 of each indicium 32 is not disposed within the viewing angle Θ of any of the light-emitting diodes 40. As shown in FIG. 3, each indicium 32 is inset from the back face 22 to a plane, which is located at a sufficient depth from the back face 22 to cause the centerline of at least one of the light-emitting diodes 40 not only to pass through the boundary 34 of such indicium 32 but also to be offset between the plane and the back face 22.

Because the minor part 34 of the boundary 32 of each indicium 32 is not disposed within the viewing angle of any of the light-emitting diodes 40, some of the light emitted by the light-emitting diodes 40 bypasses the indicia 30 is reflected internally by the back face 22, the front face 24, and the outer edge 28 so as to impinge upon other parts of the boundaries 32 and upon the inner faces 34. Thus, the light-emitting diodes 40 illuminate the indicia 30 directly where the light impinges directly upon the boundaries 32 or indirectly where the light that is reflected internally impinges upon the boundaries 32 or upon the inner faces 34.

As shown in FIGS. 3 and 4, an opaque material 50 covers the back face 22 in its entirety, except where the photoconductive plate 20 is inset so as to define the indicia 30, and a sheet 60 with a fluorescent surface 62 is affixed by an adhesive layer 64 to the back face 22, over the opaque material 50, so that the fluorescent surface 62 covers the indicia 30 and faces the front face 24. Preferably, the opaque material 50 is a black enamel, and the sheet 60 is made of paper. Alternatively, the sheet 60 is made of polycarbonate, such as Lexan™. As shown in FIG. 3, the recess 26 for each light-emitting diode 40 orients such light-emitting diode 40 so that a part 64 of the fluorescent surface 62, where the fluorescent surface 62 covers each indicium 32, is disposed within the viewing angle Θ of at least one of the light-emitting diodes 40.

The fluorescent surface 62 is adapted to fluoresce when illuminated by ambient light, by the light emitted by the light-emitting diodes 40 when energized, or by both, so as to emit light of a color matching the color of the light emitted by the light-emitting diodes 40 when energized. Preferably, therefore, the fluorescent surface 62 when illuminated thereby emits light of a red-orange color.

Figure 7:
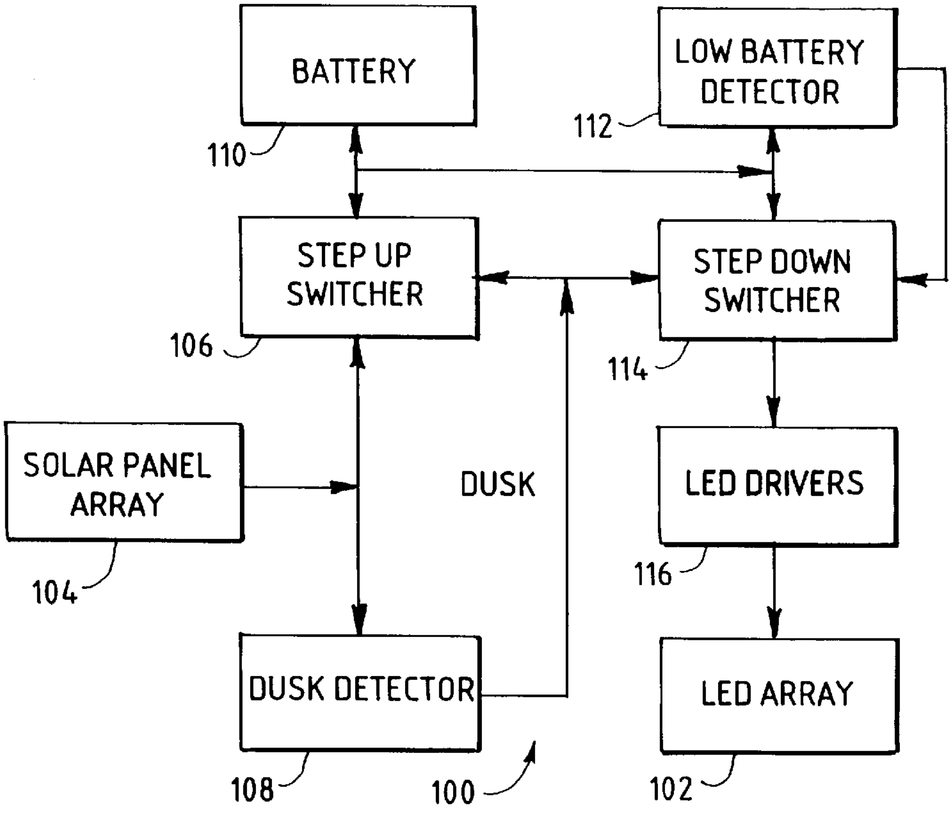
FIG. 7 is a block diagram of an electrical circuit for powering an array of the light-emitting diodes.

FIG. 7 is a block diagram of an electrical circuit 100 for powering a light-emitting diode array 102, which is comprised of the series the light-emitting diodes 40. The circuit 100 comprises a solar panel array 104 having a rated output of 8.5 volts dc at 90 mA, a step-up switching circuit 106 having a design setpoint of 6.5 volts dc, a dusk detector 108, and a rechargeable, sealed, lead-acid battery 110 rated at 6 volts dc at 1.3 ampere-hours.

Under conditions of daylight, the battery 110 is recharged. Under conditions of dusk or darkness, the battery 110 powers the light-emitting diode array 102. Critical attention is given to minimizing energy conversion losses due to the varying outputs of the energy sources, namely the solar panel array 104 and the battery 110.

The output of the step-up switching circuit 106 is coupled to the battery 110, to a low battery detecting circuit 112, and to a step-down switching circuit 114 having a design setpoint of 3 volts dc. Also, the output from the step-down switching circuit 114 is coupled to a light-emitting diode driving circuit 116, which is arranged to drive the light-emitting diode array 102.

Although the solar panel array 104 has a rated output of 8.5 volts at 90 mA, its actual output voltage may be much less under dim ambient light conditions. However, the step-up switching circuit 106 insures that the battery 110 is recharged without regard to the ambient light conditions. When the output voltage from the solar panel array 104 exceeds the design setpoint of the step-up switching circuit 106, the output voltage from the solar panel array 104 is coupled through the step-up switching circuit 106 to the battery 110, substantially unchanged.

The output of the solar panel array 104 also is coupled to the dusk detector 108, which is a light level detector, for detecting the onset of dusk or darkness. Under dark conditions, the output of the dusk detector 108 is coupled both to the step-up switching circuit 106 and to the step-down switching circuit 114, whereby the step-up switching circuit 106 is disabled and the step-down switching circuit 114 is enabled. Once disabled, the step-up switching circuit 106 draws minimal standby current. Once enabled, the step-down switching circuit 114 is used to attain a target voltage close to the typical forward voltage drop of the light-emitting diode array 102, which drop is approximately 2 volts at 20 mA driving current.

The low battery detection circuit 112 is arranged continuously to monitor the output voltage from the battery 110. The output voltage from the battery 110 tends to drop in time and under load. If the low battery detection circuit 112 detects an excessive drop in the output voltage from the battery 110, the low battery detection circuit 112 disables the step-down switching circuit, whereby to prevent overdischarge and permanent failure of the battery cells.

Various modifications may be made in the preferred embodiment without departing from the scope and spirit of this invention.

What is claimed is:

1. An illuminated sign comprising:

(a) a photoconductive plate having a front face, a back face, and an outer edge, the photoconductive plate being inset from the back face, toward the front face but not through the photoconductive plate, so as to define an inset indicium having a boundary, (b) a light-emitting diode of a type that has a viewing angle, the light-emitting diode having a centerline and being pressed into a recess that opens at the outer edge of the photoconductive plate, between the front and back faces, the recess orienting the light-emitting diode so that a part of the boundary of the inset indicium is disposed within the viewing angle of the light-emitting diode, the indicium being inset to a plane at a sufficient depth from the back face to cause the centerline of the light-emitting diode to pass through the boundary of the indicium and to be located between the plane and the back face, (c) an opaque material covering the back face, at least where the back face is visible through the front face, except where the photoconductive plate is inset so as to define the indicium, and (d) a fluorescent material covering the inset indicium, visible through the front face, and adapted to fluoresce when illuminated by ambient light, by light emitted by the light-emitting diode, and by both.

2. The illuminated sign of claim 1 wherein the recess orients the light-emitting diode so that another part of the boundary of the inset indicium is not disposed within the viewing angle of the light-emitting diode.

3. The illuminated sign of claim 2 wherein the light-emitting diode has a viewing angle not more than approximately 45°.

4. The illuminated sign of claim 3 wherein the light-emitting diode has a viewing angle of approximately 8°.

5. The illuminated sign of claim 1 wherein the light-emitting diode has a viewing angle not more than approximately 45°.

6. The illuminated sign of claim 5 wherein the light-emitting diode has a viewing angle of approximately 8°.

7. An illuminated sign comprising:

(a) a photoconductive plate having a front face, a back face, and an outer edge, the photoconductive plate being inset from the back face, toward the front face but not through the photoconductive plate, so as to define a series of inset indicia with each indicium having a boundary, (b) a series of light-emitting diodes of a type that has a viewing angle, each light-emitting diode having a centerline and being pressed into a recess that opens at the outer edge of the photoconductive plate, between the front and back faces, the recesses orienting the light-emitting diodes so that a part of the boundary of each of the series of inset indicium is disposed within the viewing angle of at least one of the light-emitting diodes, each one of the series of indicia being inset to a plane at a sufficient depth from the back face to cause the centerline of at least one of the light-emitting diodes to pass through the boundary of at least one of the series of indicia and to be located between the plane and the back face, (c) an opaque material covering the back face, at least where the back face is visible through the front face, except where the photoconductive plate is inset so as to define the series of indicia, and (d) a fluorescent material covering each of the series of inset indicia, visible through the front face, and adapted to fluoresce when illuminated by ambient light, by light emitted by the light-emitting diode, and by both.

8. The illuminated sign of claim 7 wherein the light-emitting diode has a viewing angle not more than approximately 45°.

9. The illuminated sign of claim 8 wherein the light-emitting diode has a viewing angle of approximately 8°.

* * * * *